Patented May 21, 1940

2,201,366

UNITED STATES PATENT OFFICE 2,201,366

MOLD COMPOSITION AND METHOD OF PRODUCING SAME

Vladimir A. Grodsky, Washington, D. C.

No Drawing. Application August 2, 1939,
Serial No. 288,036

6 Claims. (Cl. 22—188)

My invention consists in a new and useful improvement in mold compositions and method of producing same, and is designed to provide a composition having the peculiar characteristic of causing an ordinary sand mold to possess a very high degree of heat conductivity. When a metal or an alloy is cast in a metallic mold, it will always have higher physical properties as compared with the properties of the same metal cast in a sand mold. Chilled metal has a finer grain structure, greater density, higher tensile strength and very often a higher elongation. It is common practice in foundries to use with sand molds local chills on castings. These chills consist of pieces of cast iron or copper which are embedded into the sand of the mold and produce a chilling effect when the molten metal comes in contact with them. My invention provides a composition which produces a similar chilling effect over the whole casting. Comparing the heat conductivity of different substances, it is well-known that of all non-metallic substances graphite (especially artificial graphite) has the highest heat conductivity. Numerous attempts have been made to secure this highly beneficial heat conductivity of graphite, such as producing permanent molds from compressed graphite, and mixing graphite with foundry sand and numerous other substances to produce compositions for use as substitutes for ordinary foundry sand or as facings for sand molds. All such previous attempts to produce a composition, for use as a substitute for ordinary molding sand, or for facing sand molds, possessing a high degree of heat conductivity due to its graphite content, have proven entirely unsuccessful for two very obvious reasons. The first is the well-known difficulty of controlling, or fixing, the graphite particles in such a way that the resulting composition may have practical utility, and the second is the harmful results from compositions in which the graphite particles have been fixed. In other words, many of the attempts to produce a graphite containing composition having high heat conductivity have failed because the graphite particles could not be so fixed as to make a composition of practical utility, and such compositions as have been made, in which the graphite particles have been fixed, have definite characteristics causing harmful results in their use. My improved method, proven by actual experience, has overcome both of these hitherto insurmountable difficulties. I have produced a composition in which the graphite particles are satisfactorily fixed, so as to cause my improved composition to have the desired degree of heat conductivity, and my composition has demonstrated by actual use that it is entirely free from the harmful effects of other similar graphite containing compositions.

Because of the well-known difficulty of fixing the graphite particles in a composition to be used as a substitute for mold sand or as a facing for such sand, the use of graphite as a high heat conducting element has generally been limited to the production of permanent molds composed in whole or in part of graphite particles, the cost of production being commercially prohibitive, or to the use of graphite particles in combination with other substances, as a fine impalpable powder, to be used as a dusting agent for treating the face of a sand mold. Since the latter method of foundry operation has many practical difficulties and fails to produce the desired effect of high heat conductivity, it is not to be compared with the practice of making a sand mold with a composition having the desired degree of heat conductivity.

While I am aware that there have been produced certain compositions of which graphite particles are an ingredient, for use in sand molds, all such compositions have certain characteristics which render their use unsatisfactory, because of harmful results. These results are due to the fact that certain constituents of the composition, which are requisite to fix the graphite particles in the composition, are of such a character that when the molten mass in the molds contacts the composition, the composition is so affected by the heat that its constituents are modified to produce harmful results upon the metal. My improved composition is produced by my improved method so that its character is unaffected by the contact of the molten mass in the mold and no injurious effects are caused by said contact. The specific problem which I have solved by my invention, in the production of my composition having a high graphite content, to be used in a sand mold, is to provide a carrier element for the graphite particles and to fix said particles to said element, the carrier element and binder having such a character as to be unaffected by the degree of heat transferred to the composition from the molten mass as it enters the mold. It is my contention that this problem has not hitherto been solved, and that my actual experience in the use of my improved composition has demonstrated that I have satisfactorily solved this problem.

In all compositions hitherto conceived for this purpose either the carrier element, or the binder, or both, are of such character that they are affected by the degree of heat transferred to the composition from the molten mass as it enters the mold. It has been proposed to fix the graphite particles by the use therewith of clay particles. It is, of course, well-known that all clays contain hygroscopic water, and that it may be expelled by heating. However, merely raising the material to a degree sufficient to expel such hygroscopic water does not cause the material to be uneffected by the high temperature to which the composition is subjected by the contact of the molten mass as it enters the mold, since all clays also contain water in chemical combination. Should this constituent be driven off by a sufficiently high temperature the clay loses its plasticity. Therefore, ordinary clays used as a carrier and binder for the graphite particles can not be treated to remove this water in chemical combination. It is this constituent in the composition using such clays which, affected by the high temperature of the molten mass, causes the harmful results from the use of such composition. It has also been proposed to fix the graphite particles by the use therewith of coke particles, with a cokable substance as a binder, the composition being treated by such a degree of heat as to coke the binder, to produce a homogeneous mass. However, it is to be particularly noted that in such compositions both the carrier and binder having been raised to a degree of heat only sufficient to coke the binder are still not caused to have such a character as will be unaffected by the degree of heat to which the composition is subjected by the contact of the molten mass as it enters the mold, and it is these cooked constituents, in the composition, which, affected by the high temperature of the molten mass, cause the harmful results from the use of such compositions.

I have obviated the above described harmful results by producing a composition of granules consisting of graphite particles and clay particles united by a binder, which are not affected by the high degree of temperature to which the composition is subjected by the contact of the molten mass as it enters the mold. To effect this result, I mix the graphite particles, clay particles and binder, and subject the mixture to such a high degree of temperature that the clay particles are completely dehydrated and the graphite particles are securely bound therewith by the action of the binder, in such a way that the resulting granules possess the characteristic of being unaffected by the high temperature transferred to the composition by the contact of the molten mass as it enters the mold.

I will now describe the novel method by which I produce my novel composition. Any suitable form of clay is mixed with a suitable form of graphite and to this is added a suitable form of binder, such as borax. I have found that the proportions of the ingredients may vary within the following limits—graphite from 20% to 50%; clay from 40% to 78%; borax from 2% to 10%. The mixture is dried and then subjected to a temperature of from 2000° to 2400° F. After it has cooled, it is crushed and screened through a 60 mesh screen, thereby providing granules comprising clay particles and graphite particles intimately bound together by the action of the borax, of the size and shape of the granules of good foundry sand.

I have demonstrated by actual practice that my improved composition can be utilized in the same way as ordinary foundry sand. My experience has shown that in some cases it is not necessary to fill the mold with my composition but that I can properly prepare my composition in the same way that ordinary foundry sand is prepared for the mold, and cover the pattern with a layer of approximately one-half an inch in thickness of my improved composition, and then an ordinary sand mold is formed about the covered pattern. I have found that the desired results are produced in the castings by the use of this half-inch layer of my improved composition. Since my improved composition is unaffected by the heat of the molten mass, it is possible to use the compositition repeatedly, which is a very great commercial advantage.

It is well-known that in the use of metallic molds it is frequently necessary to raise the temperature of the mold before use. This is due to the fact that the unheated mold, because of its high degree of heat conductivity, causes a chilling effect so great as to produce undesirable results. It is obviously very difficult to produce and maintain the proper temperature of the mold so that it will produce the most desirable chilling effect upon the metal in the mold. It is to be particularly noted that molds using my improved composition are not subject to such uncertainty of degree of chilling effect, and do not require any change of their temperature before use. My improved composition, because of its peculiar character, produces the desired chilling effect. The foregoing makes obvious the manifest advantage of molds using my composition over metallic molds.

Having described my invention, what I claim is:

1. A mold composition comprising graphite particles, dehydrated clay particles and borax.

2. The method of producing a mold composition which comprises mixing graphite particles, clay particles and borax; subjecting the mixture to the effect of that degree of heat sufficient to completely dehydrate the clay particles and cause the borax to bind the graphite particles to the clay particles; and crushing and screening the mixture to produce granules of the size of ordinary mold sand composed of graphite particles and clay particles.

3. The method of producing a mold composition which comprises mixing graphite particles, clay particles and borax; heating the mixture to a temperature of from 2000° to 2400° F.; and processing the mixture to produce granules composed of graphite particles and clay particles.

4. A mold composition comprising graphite particles, dehydrated clay particles and a binder adapted to unite said graphite particles with said clay particles when the composition is subjected to that degree of heat sufficient to dehydrate the clay particles.

5. The method of producing a mold composition which comprises mixing graphite particles, clay particles and a binder; subjecting the mixture to the effect of that degree of heat sufficient to completely dehydrate the clay particles and cause the binder to bind the graphite particles to the clay particles.

6. The method of producing a mold composition which comprises mixing graphite particles, clay particles and a binder; subjecting the mixture to the effect of that degree of heat sufficient to completely dehydrate the clay particles and cause the binder to bind the graphite particles to the clay particles; and processing the mixture to produce granules composed of graphite and clay particles.

VLADIMIR A. GRODSKY.